Patented Dec. 31, 1946

2,413,294

UNITED STATES PATENT OFFICE 2,413,294

CEMENTITIOUS PREPARATIONS

David Curtis, New York, N. Y.

No Drawing. Application February 16, 1943,
Serial No. 476,113

13 Claims. (Cl. 260—22)

The present invention relates to cementitious preparations suitable for use in dental practice and to methods for preparing the same.

It is the object of the present invention to provide cementitious preparations of the character described which are of improved strength and durability.

It is another object of the present invention to provide cementitious preparations of the character described which are suitable for temporary use purposes as well as for more lasting purposes.

It is also an object of the present invention to provide cementitious preparations of the character described which exert an alkaline reaction.

It is a further object of the present invention to provide binding liquids or compositions to serve as vehicles for the dry ingredients of cements which serve to form, with the dry ingredients, cementitious preparations of improved adhesive, durability and strength characteristics.

It is a still further object of the present invention to provide a new group of substances suitable for use as the dry ingredients of cementitious preparations.

The dental profession has, for a long time, used cements formed from eugenol and zinc oxide, mainly, however, as a temporary cement. I have found, however, that by dissolving or otherwise combining one or more of the so called vinyl or acrylic acid derivative plastics, or their copolymers, in or with eugenol or analogous substances, a binding liquid or vehicle for zinc oxide or other solid cement ingredients is provided which combines with such solid ingredients to form cements which are of greater strength, more durable, more adhesive and more moisture resistant than when zinc oxide and eugenol alone is used.

Generally stated, the binding liquid or fluid of the present invention may comprise a solution of one or more polymers of the vinyl or acrylic or other similar synthetic compounds or their copolymers with one another or with other substances, dissolved or otherwise combined in or with one or more aromatic liquid compounds of the type having an allyl or its isomeric, propenyl, chain, and having in the benzene nucleus one or more hydroxyl groups or substituted hydroxyl groups, of the alkyl or aryl groupings, to form ethers, or acyl groupings, to form esters.

Among the aromatic compounds which I may use to form the liquid or fluid binders of the character described, the following may be listed as examples:

Chavicol (p-allyl-phenol), having the structural formula

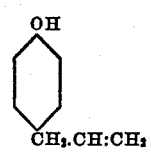

Methyl chavicol (p-allyl-methoxy-benzene) having the structural formula

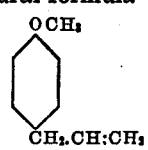

Eugenol (4 allyl-2-methoxy-phenol) having the structural formula

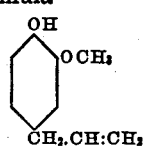

Eugenol methyl ether (3,4-dimethoxy-4-allyl-benzene) having the structural formula

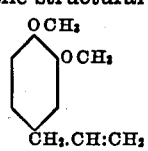

Also, ethyl, propyl, butyl, amyl and allyl ethers of eugenol, and similar ethers having aryl groupings, as the phenyl, benzyl, cinnamyl and like ethers of eugenol. Likewise, the variants of eugenol, such as 2,4-dimethoxy-allyl benzene; 2-hydroxy-4-methoxy-allyl-benzene; 6-hydroxy-3-methoxy-allyl-benzene; and 3,6-dimethoxy-allyl-benzene. Also the esters of eugenol, such as eugenol benzoate

and eugenol cinnamate

[(C₃H₅).C₆H₃(OCH₃) CO₂.CH:CH.C₆H₅]

and others. Also ethers of eugenol such as saffrol, an inner ether present in oil of sassafras, together with eugenol, etc., having the structural formula

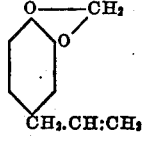

(3,4-methylenedioxy-allyl-benzene)

Also the iso- compounds of the above listed substances, that is those having a propenyl group in the chain, instead of the allyl group, such as, iso-eugenol; iso-eugenol methyl ether and its derivatives: di-iso-eugenol, $(C_{10}H_{12}O_2)_2$ and di-methyl di-iso-eugenol $(C_{11}H_{14}O_2)_2$; anethole, which is the isomer of methyl chavicol and has the structural formula

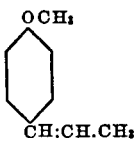

(1-methoxy-4-propenyl-benzene) occurs in anise seed, star anise and fennel oils; iso-chavicol (p-propenyl-phenol), having the structural formula

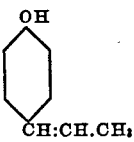

iso-safrole (3,4-methylene-dioxy-propenyl-benzene) having the structural formula

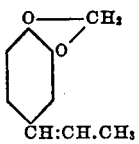

The aromatic liquids may be used singly or in combination. They are used in combination especially when an ester or ether of the aromatic compounds named is used, for the reason that an ether or ester, alone, will not combine with a metallic oxide or hydroxide in the ordinary way.

Of the plastic substances that may be used for the purposes of the present invention, either as powders of the more or less completely polymerized state or as highly viscous, or incompletely polymerized pastes, the following may be given as representative:

Methyl-methacrylate, styrene, vinyl chloride, vinyl acetate, and the like, either singly or in mixtures with one another or copolymerized in combinations of two or more with each other, and in various proportions. Also the copolymers of any of the foregoing substances, mixtures or combinations with other substances that will copolymerize with them. Such other substances include the fatty and essential oils, and their variants and derivatives, which have a double-bond carbon grouping in their molecular structure.

The essential oils include both the aliphatic and aromatic, either as alcohols, ketones, aldehydes and esters or their synthetically prepared derivatives.

The fixed oils, generally found in the form of glycerides, include their synthetically prepared derivatives, which include their respective ketones, alcohols, aldehydes, acids and esters, especially the esters of the lower aliphatic alcohols, of the acetyl group and of the alkyl acetyl group. Among the fixed oils that may be used to form copolymers the following may be named: linseed oil, both raw and boiled; oil of sesame; olive oil; castor oil, both the raw and the synthetically prepared dehydrated form. Among their derivatives, the following more readily available may be given as examples: linoleic acid and linolenic acid (containing, respectively, 2 and 3 double bonds within the molecule and present as glycerides in linseed oil); oleic acid; ricinoleic acid and its esters, such as acetyl and alkyl acetyl esters, as well as similar esters of oleic acid and the like.

The esters of the fatty acids of the fixed oils and the lower aliphatic alcohols include the methyl, ethyl, iso and normal propyl, iso and normal butyl, allyl, amyl; and of the acetyl derivatives—methyl acetyl ricinoleate, ethyl acetyl ricinoleate, butyl acetyl ricinoleate, allyl acetyl ricinoleate, amyl acetyl ricinoleate and the same type of alkyl acetyl esters of the other fatty acids of the fixed oils. Also, acetylated castor oil.

Of the aromatic esters of the fatty acids of the fixed oils, the following may be included: the phenyl, cinnamyl, benzyl, salicyl, phenylethyl, and the like.

Of the essential oils and their derivatives that may be used to form copolymers, the following may be given as examples: geraniol and geranial; linalool; oil of citronella as well as citronellal and citronellol; oil of cassia, cinnamic alcohol and aldehyde; oil of cinnamon, eugenol and iso-eugenol, oil of cloves, anethole; oil of sassafras; saffrol; cinnamyl cinnamate; the alkyl cinnamates, such as ethyl, methyl, allyl, amyl, butyl, propyl; as well as the aryl esters of cinnamic acid, such as the benzyl, phenyl and phenylethyl esters. Also, alpha-amyl cinnamic aldehyde may be used. Also the following: eugenol cinnamate; iso-eugenol methyl ether and eugenol methyl ether; oil of bay, containing eugenol and derivatives; oil of anise, and the like.

The above mentioned oils and their derivatives may be copolymerized with the acrylic or vinyl liquids or with the various mixtures thereof, to form suitable products in solid or semi-solid form, or partially copolymerized to viscous fluids or solids to be dissolved in the aromatic liquid or to be copolymerized with some of the aromatic liquids mentioned herein to form suitable binding fluids for the cementitious preparations of the present invention. The manner of copolymerizing and the proportions of the various suitable copolymers were enumerated in my copending application, Serial No. 464,779, filed November 6, 1942.

The plastic polymer or copolymer, preferably in powdered form, and preferably in fine, uniform, powder form, is added to the aromatic liquid. When the aromatic liquid begins to act on the surfaces of the powder particles, a pasty, gummy mass is formed and agglomeration sets in. This agglomeration of solid and liquid is promoted by warming, as on the water bath. With some polymers, a portion of the solid may go into the solution in certain of the aromatic liquids; the undissolved excess causing the gummy or spongy consistency of the mass.

The consistency or viscosity of the mass of mixed powdered polymer and aromatic liquid will depend on the proportion of the powder to liquid as well as on the nature of the polymer used.

For purposes of preparing such a mixture, suitable, itself, for dental cement purposes, approximately 1:3 parts of liquid to powder may be used. When a mixture of such proportions is heated on the water bath, a stringy, gummy mass, more or less rubbery in nature, is formed. Such mass will soon set and may be used to fill a dental cavity or pulp chamber, either as temporary or more permanent filling. The setting may be from rubbery to hard consistency, depending upon the particular ingredients and on the proportions used. The filling, even when rubbery, adheres and stays in place, functioning as an effective protective medium.

By way of example, the following cements may be prepared:

*Example 1.*—3 gms. of powdered polymeric methyl methacrylate is mixed with 1 cc. of eugenol and the mixture is heated on the water bath, and mixed and worked until it becomes gummy and stringy and elastic. The mass soon sets into a crystalline agglomerate, hard and compact.

When equal quantities of the above ingredients are used, the mass, after heating and working it, also assumes an elastic gummy form, setting to a compact, slightly resilient, rubbery mass.

Similarly, other polymers or copolymers and other aromatic liquids may be used for the same purpose. It must be stated, however, different proportions may be required to obtain like results. It may here be stated that with preparations like the above, wherein the predominant portion of the polymer is not in solution and wherein the polymer particles or crystals are held in an agglomerate state by the plasticizing and binding effect of the aromatic liquid, it is possible to incorporate zinc oxide or other suitable metallic oxides and hydroxides or salts into the component mass, even though the aromatic liquid used is of a type that does not combine directly with such metallic compounds to form a cementitious mass, such substances being occluded or encompassed within the final, set mass.

It will be readily seen that the use of an aromatic liquid of the type described as a liquid carrier and binding fluid for the polymeric substances, especially when such substances are in powder form, is of great advantage, particularly when used for dental cement purposes, because such liquids are non-volatile at room temperature, are relatively non-toxic in the amounts and conditions used, and are highly effective and efficient as carrier and binding liquids for the polymeric powders. Furthermore, some of the aromatic liquids, such as eugenol, have well known therapeutic properties for which they have been used in dentistry for a long time.

Solutions of polymeric substances in the aromatic liquids may also be obtained. Such solutions constitute, in themselves, highly effective and extremely efficient binding fluids for cement solids, such as the metallic compounds hereinafter named, or for additional polymeric substance, to form with them greatly improved cementitious preparations.

Such solutions of polymeric substance in aromatic liquid may be prepared in several ways. One way is to use a predominance of liquid over polymeric substance and heating the mixture over a low flame on a hot plate or on a steam bath; clearing the resinous mass of the polymeric substance, if any forms, by detaching from the wall of the container and keeping it suspended in the liquid, until complete solution, by frequent stirring.

The proportion of aromatic liquid required to bring any given polymeric substance of the group named into solution, by the above method, may depend upon the nature of the polymeric substance as well as its degree of polymerization.

Solutions of a fluidity which is highly desirable because of ease of manipulation and spatulation for the purpose of incorporating the solids hereinafter named may comprise between 10 and 20 percent of polymeric substance to a balance of aromatic liquid. Of course, even lower concentrations of polymeric substance have a beneficial effect on the final cement set. Likewise, higher concentrations, when possible, with certain of the polymeric substances or degree of polymerization of such substances, though they may not be as fluid, may yet be capable of being worked to incorporate cement solids therein. If desired, the fluidity of such solutions may be increased by dilution with additional aromatic liquid, with additional heating and stirring, if necessary.

Certain polymeric substances, and especially copolymers, can be dissolved in the aromatic liquids in proportions where they even predominate over the liquid and a final solution of sufficient fluidity for working and spatulation obtained. Thus, a copolymer of styrene and methyl cinnamate (4:1) may be dissolved to the extent of over 50%, to obtain a fluid mass. Also, a copolymer of styrene and methyl methacrylate may be dissolved to the extent of about 50%. Likewise, a 40% solution, in eugenol, may be made of a copolymer consisting of 20% alpha-cinnamic aldehyde and 80% of partially polymerized styrene and methyl methacrylate (3:1). So, also, polyvinyl acetate may be dissolved to the extent of about 40%, in eugenol, and a fluid solution obtained.

Polymeric substance, comprising the condensation product of polyvinyl acetate or polystyrene or polymethyl methacrylate, and others with iso-eugenol, anethole and some other aromatic liquids having the propenyl group in the chain, may also be dissolved in the aromatic liquids. A convenient method for preparing such condensation products is to first dissolve the polymer or copolymer in the iso-eugenol or similar aromatic liquid and then add to the solution a small amount of stannic chloride or other suitable catalyst. Condensation takes place, readily accelerated through the application of heat.

By way of example: To 50 gms. of a 30% solution of polyvinyl acetate in iso-eugenol, about 0.1-0.15% of stannic chloride is added, at a temperature of about 85° C.. Upon stirring, an exothermic reaction ensues, and the mixture soon condenses to a grayish, resin-like, solid mass. A 20% solution of this condensation product, pulverized, may be made with eugenol or other aromatic liquid.

Thus, when 10-20 percent of powdered, polymerized methyl methacrylate or styrene or a mixture of both, is incorporated into eugenol, or iso-eugenol, or their methyl ethers, or mixtures of any of them, and the mixtures subjected to heat, in a suitable vessel, with occasional stirring to keep the polymer suspended, solutions of suitable viscosity for working and spatulation are obtained. If done on a large scale and, if desired, to prevent possible excessive oxidation, an inert gas, as nitrogen, may be bubbled through the fluid during the operation of dissolution; or a suitable anti-oxidant or inhibitor, such as hydroquinone or the like, may be added to the aromatic liquid at the beginning of the operation. Also, a catalyst may be added, after dissolution, and, through the continuous application of heat, if necessary, cause polymerization of the aromatic liquid and complete solidification of the mass, which may, subsequently be redissolved in aromatic liquid of the character named herein.

When the same polymeric substances of the foregoing example are used in proportions of about 35% to aromatic liquid, a transparent, homogeneous, amber-colored, resinified mass is obtained. This mass does not yield to ready spatulation or trituration, and so may be rendered suitably fluid by additional aromatic liquid, with heating and stirring. However, such resinous masses are sufficiently pliable to be worked in a proper milling device, in the same manner as rubber, for the purpose of adding suitable fillers, vulcanizers and accelerators, and the like.

Polyvinyl chloride will condense with isoeugenol or other aromatic liquid even without the addition of a catalyst, with the application of heat, to yield a gummy, resinous, rubbery mass. This mass, upon dispersion in aromatic liquid, with the application of heat, will yield a liquid mass of gelatinous consistency, capable of being spatulated and worked with metallic oxides and the like.

By way of example: 10 gms. of polyvinyl chloride are mixed with 25 cc. of eugenol, by heating the liquefied mix over a low flame on a hot plate, a gummy, resinous, condensation product is obtained. When a 40% of polyvinyl chloride is incorporated into eugenol, under 2–15 lbs. of pressure, in a closed vessel, a rubbery mass, fluffy and spongy in appearance is obtained. When 30% of polyvinyl chloride is incorporated into iso-eugenol containing 5–10% of allylthiourea in solution, and heated in a closed vessel under 2–15 lbs. of steam pressure, a gummy, rubbery mass is obtained, amber in color and transparent.

By the use of steam pressure of between 2–15 lbs., as high as 65–70% of polymeric substance may be incorporated into aromatic liquid. The resulting product is a solid mass, generally rubbery in nature.

By way of example: 35 gms. of polystyrene is mixed with 15 gms. of eugenol. The mixture is heated on a hot plate, over a low flame, until it becomes gummy. It is then transferred into a closed vessel and heated at 2–15 lbs. of steam pressure for about 15 hours. A rubbery, transparent homogeneous mass is obtained. When polymethyl methacrylate is used, the resulting mass is also tough and rubbery, turning hard.

Fluid solutions of polymeric substance in aromatic liquid are highly suitable and efficient binding fluids for certain solids, to form strong, highly adhesive cements, when set. Such solids may comprise additional powdered polymeric substance.

By way of example: To 15 gms. of a 17½% solution of methyl methacrylate, 30 gms. of additional powdered methyl methacrylate is stirred in. The mixture is thoroughly stirred while heating on a water bath. Soon, a gummy elastic material is obtained. A mass so prepared is tougher and more compact than when the 30 gms. of methyl methacrylate are incorporated in 15 cc. of eugenol alone, in the manner set forth in Example 1.

Similarly, other preparations may be made by dissolving various other polymeric substances in the various other solutions of different polymeric substances in the different aromatic liquids. The proportions of solution to additional polymeric powder may vary. The essential requirement to obtain a suitably setting preparation is the same as in the preparations of the type described in Example 1, namely, that sufficient fluid be present to moisten all of the particles of the additive polymeric substance, so as to cause the particles to coalesce and agglomerate by the solvent effect of the aromatic liquid present upon the polymeric substance.

Solutions of polymeric substance is aromatic liquid consisting of or containing such liquids in which there is at least one non-substituted hydroxyl group, find great usefulness as binding and reactant fluids for metallic compounds such as the zinc oxide conventionally used as the cement powder in dental cements. A cement prepared from such binding fluid and zinc oxide, for instance, is more compact, stronger, more adhesive and more durable than a cement prepared from similar proportions of zinc oxide and a reacting aromatic liquid, such as eugenol, alone.

Thus, when eugenol combines with zinc oxide in the proportion of 2 moles of eugenol to 1 mole of zinc oxide, as, for instance, 42.6 gms. of eugenol to 10.55 gms. of zinc oxide, with the formation of zinc eugenate, when set, a brittle compound is formed, which crumbles easily, splitting in all directions radiating from the center.

However, when 50 gms. of a 17½% solution of polymeric styrene in eugenol (containing 41.75 gms. of eugenol) is combined with its equivalent of 10.33 gms. of zinc oxide (the proportion of zinc oxide to eugenol also being 2 moles of eugenol to 1 mole of zinc oxide), a strong, compact mass is obtained, when set, wholly different and superior in strength and resistance to crumbling and in adhesiveness, to the combined zinc oxide in eugenol alone. The same improved qualities are obtained with binding fluids containing other polymeric substance dissolved in other suitable aromatic liquids, as, for instance, 10–20% solutions (or even higher, when the resultant fluidity of the solution will permit) of polymethyl methacrylate, polyvinyl acetate, the copolymer of vinyl acetate and vinyl chloride, the copolymer of vinyl acetate with methyl methacrylate, and all other polymeric substances named herein, in eugenol, iso-eugenol, chavicol and the other hydroxylated aromatic fluids, as well as their mixtures with substituted hydroxylated aromatic liquids.

In actual practice, as at present followed, dentists use much greater proportions of zinc oxide to eugenol in forming cements, than indicated above, even as high as 4 or 5 or more parts of zinc oxide to the eugenol. When the same proportions of zinc oxide are used with eugenol or like aromatic liquid containing polymeric substance in solution, the cements obtained are likewise comparatively stronger and of improved characteristics.

I have also found that, besides zinc oxide, other metallic compounds will readily react with the non-substituted hydroxylated aromatic liquids and may, therefore, be effectively used as the reacting cement solids to be added to solutions of synthetic polymeric substance in non-substituted-hydroxylated aromatic liquid or mixtures thereof with substituted-hydroxylated aromatic liquid. Such other metallic compounds include zinc hydroxide; the oxide and hydroxide of calcium; the oxide and hydroxide of magnesium; the oxide and hydroxide of barium; the oxides and hydroxides of the alkali metals, sodium, potassium and the like. Although some of the metallic compounds may not be preferred for use in dental cements, they are all, however, suitable for cements for other purposes.

These metallic oxides and hydroxides may successfully be used with zinc oxide or by themselves, not only to initiate the setting reaction with eugenol or other hydroxylated aromatic liquids or with mixtures thereof with non-hydroxylated aromatic liquids, but also and especially to impart to the final cement mass an alkaline-exerting reaction when coming in contact with moisture. Such a mix, and especially when further admixed with the well known antiacid aluminum hydroxide, forms a highly useful and efficient acid-neutralizing cement substance, thereby arresting and limiting further extensive decay in the tooth structure where the cement mix is deposited.

In addition to the aluminum hydroxide, other metallic compounds may be admixed with the reacting portion of the cement solid ingredients. These metallic compounds give greater body and strength as well as compactness to the hardened mass. Among these the following may be included: stannous and stannic oxide and hydroxide; aluminum oxide; aluminum silicate; calcium silicate; zinc silicate; calcium aluminate; titanium oxide; mercuric oxide; silver oxide and hydroxide; copper oxide; strontium oxide; iron oxide; lead oxide (for certain purposes); the various synthetic cement powders, calcined and plain, as well as calcined zinc oxide; barium sulfate; calcium sulfate, anhydrous as well as hydrated; zinc phosphate; calcium phosphate; aluminum phosphate; beryllium oxide and hydroxide; talc; silicious materials, and the like; and numerous other metallic oxides and hydroxides and other metallic compounds and metals suitable to be used as fillers.

To the powders outlined, individually or in mixtures, the following may also be added: certain organic metallic salts, among which are pulverized zinc eugenate as well as the pulverized material of zinc eugenate formed with a synthetic polymeric substance dissolved in the aromatic liquid, or any of powdered, solidified cements described herein. Also, zinc oleate, lineoleate and stearate; aluminum oleate, linoleate and stearate, and the like. These may be added either in previously formulated form or may be compounded through the process of addition of the fatty acid to the aromatic liquid before the metallic compound is added thereto.

Specifically, for purposes of speeding up the setting and hardening of the cement mixes, preferably zinc acetate is added to the cement powder, in the amount of, preferably, 0.1–2.0% of the total weight of the cement powder. More or less could be used, in accordance with the rate of setting desired. Similarly, tin oxyacetate can be used, and, to a lesser extent, aluminum acetate and others. I may also add acetic acid to the aromatic fluid, for the same purpose, in an amount of about 0.1–2.0%, more or less, depending upon the rate of setting desired.

As pointed out previously, in actual practice, no particular regard is given to molecular combining equivalents between the reacting metallic compound and the hydroxylated aromatic fluid used. When the cementitious mix is prepared immediately before use, as obtains in actual practice with the type of cement discussed, a predominance of metallic compound is preferably to be added to the binding fluid, until a thick paste is obtained which does not fall off the spatula. This may mean 3 to 6 times the amount, or even more, of powder to fluid.

While, when zinc oxide and eugenol, alone, are used in their combining equivalents (2 moles of eugenol to 1 mole of zinc oxide), a brittle mass is formed, a like combination with the eugenol or other like aromatic liquid containing synthetic polymeric substance in solution, greatly improved results are obtained. The same applies when uni-molar equivalents are used. Such uni-molar equivalent combinations of the ingredients of the present invention are not only superior in strength, compactness and durability, when set, but also, because of their higher viscosity prior to setting, are more manageable for use and actually suitable, if desired, for cement purposes.

Numerous combinations of the metallic compounds named may be made, in addition to the use, individually, of the reacting metallic compounds, to provide strong, compact, durable cements. Preferably, when non-reacting metallic compounds are used, singly or severally, in combination with a reacting metallic compound, the latter compound may predominate or may be used in a lesser amount of between 10–33% of the total, sufficient to initiate and complete the setting. It is a significant feature of the present inention that when a combination of reacting and non-reacting metallic powders are used, the reacting powder being in an amount as low as 10%, and used with sufficient polymer-containing aromatic liquid, such as eugenol, and the amount of aromatic liquids is in full molar combining equivalent to the reacting powder, a strong, cohesive, hard setting cement is obtained, as contrasted with a similar combination when plain eugenol or similar aromatic liquid is used; and it is even possible to use an excess of the binding fluid.

When an insufficient amount of zinc oxide is used to bring about a set, completely solid, cementitious masses may still be obtained which, though they do not set into a solid, are nevertheless of such a set cementitious nature as to enable the operator to manipulate and roll the material and tampon down into a cavity, there to remain as a protecting medium which will protect the pulp without exerting any undue pressure.

By way of illustration of the foregoing, and without any intent to serve as limitations, the following examples may be given as both, illustrative of the principles and practice of the present invention as well as preferred embodiments thereof.

*Example 2.*—10 gms. of zinc oxide, which may be mixed with about 0.5 to 2.0% of zinc acetate, are spatulated or otherwise mixed with 5 gms. of a 17.5–20% solution of polymeric methyl methacrylate or polystyrene in eugenol. The material is thoroughly spatulated or worked into a paste form, and may be used to fill a tooth cavity or to seal in an inlay or cap, or the like.

If no accelerator is used, such a mix may remain on the dental slab for about 4 days and remain in condition to be used as needed. It will set and solidify rapidly in situ, under the influence of body temperature and moisture.

*Example 3.*—20 gms. of powdered zinc oxide and 3 gms. of pulverized zinc eugenate, formed by reacting of 2 moles of eugenol with one or two moles of zinc oxide, are intermixed. This material is added to and worked in with 10 or 15 gms. of eugenol or iso-eugenol or oil of cloves containing in solution between 10 and 20 percent. of polymethyl methacrylate or polystyrene or polyvinyl acetate. The mixture is worked into a paste and may be used as a filling cement which will also remain usable for several days.

*Example 4.*—10 gms. of zinc oxide, 5 gms. of aluminum hydroxide and from 0.2 to 0.4 gm. of zinc acetate are mixed together and added to from 10–15 gms. of eugenol containing in solution between 15 and 20 percent. of polymethyl methacrylate or of polystyrene or of polyvinyl acetate or of a mixture of these. When the material sets, it forms a very hard, strong, durable mass, having a strong, abrasion resistant surface.

*Example 5.*—2 gms. of zinc oxide, 5 gms. of aluminum hydroxide and 0.05–0.2 gms. of zinc acetate are mixed and added to 9.7 gms. of eugenol containing 17.5% of polymethyl methacrylate in solution. (9.7 gms. of this binding fluid contains enough eugenol to combine with zinc oxide in the proportion of 2 moles to 1.) When set, a strong, hard mass is obtained.

*Example 6.*—2 gms. of zinc oxide, 10 gms. of titanium oxide, 10 gms. of aluminum hydroxide and 0.3 gm. of zinc acetate are mixed and added to and worked in with 9.7 gms. of eugenoul containing 17.5% of polystyrene or polymethyl methacrylate in solution. When set, a hard mass is obtained.

*Example 7.*—2 gms. of zinc oxide, 20 gms. of calcium sulfate, hydrated or partially anhydrous, and 0.2 gm. of zinc aceetate are mixed and added to and worked up with 10–12 gms. of oil of cloves containing 17.5% of polystyrene in solution. The mass sets hard and strong.

When plain eugenol is used with the above cement powders, a brittle mass is obtained.

*Example 8.*—5 gms. of each of calcium aluminate, calcium silicate, titanium oxide and zinc oxide, and 0.2 gm. of zinc acetate are mixed and worked in with 10 gms. of eugenol containing in solution 17.5% polymethyl methacrylate. When setting of this mass begins, the material can be rolled and tamponed down into a tooth cavity. After several hours, the mass sets hard. The presence of the calcium silicate or of magnesium trisilicate imparts to the worked up mass the property of being capable of being rolled and tamponed down.

*Example 9.*—10 gms. of aluminum hydroxide and 5 gms. of zinc oxide and 0.4 gm. of zinc acetate are mixed and worked in with 10 gms. of eugenol containing in solution as high as 40% of polyvinyl acetate. The mass sets hard.

*Example 10.*—15 gms. of barium sulfate, 5 gms. of aluminum hydroxide, 5 gms. of zinc oxide and 0.2 gm. of zinc acetate are mixed and worked in with 10 gms. of eugenol containing in solution 17.5–20% of polymethyl methacrylate or polystyrene or polyvinyl acetate. The mix sets hard.

*Example 11.*—10 gms. of aluminum hydroxide, 1 gm. of zinc oxide and 0.3 gm. of zinc acetate are mixed and worked in with 3 gms. of eugenol containing, in solution, 17.5% of polymethyl methacrylate. The mix sets hard and strong.

*Example 12.*—5 gms. of zinc oxide, 5 gms. of aluminum hydroxide and 0.2 gm. of zinc acetate are mixed and worked in with 12 gms. of eugenol containing 10% of a colloidal dispersion or incorporation of synthetic polymeric substance consisting of polyvinyl chloride combined with isoeugenol or eugenol by heat treatment into a rubbery mass. When the mix sets, a strong hard mass is obtained.

*Example 13.*—15 gms. of zinc oxide, 5 gms. of stannic oxide are mixed and worked in with 5 gms. of a 15% solution of polymethyl methacrylate in eugenol. The mix sets hard, strong and compact.

*Example 14.*—10 gms. of aluminum hydroxide, 2 gms. of zinc oxide and 0.1 gm. of zinc acetate are mixed and worked in with 12.5 gms. of a 17.5% solution of polystyrene in eugenol. Although the eugenol is in excess of combining equivalents, the mix sets hard and strong.

*Example 15.*—10 gms. of zinc oxide, 5 gms. of aluminum hydroxide and 0.2 gm. of zinc acetate are mixed and worked in with 5 gms. of eugenol containing in solution 20% of polymerized anethole. A strong, hard mass results.

*Example 16.*—5 gms. of stannous hydroxide—Sn(OH)$_2$—and 2.5 gms. of zinc oxide are mixed and worked in with 8.5 gms. of a 17.5% solution of polymethyl methacrylate in eugenol. The mix sets hard and strong and adheres strongly to the container.

*Example 17.*—10 gms. of stannous hydroxide and 2.5 gms. of zinc oxide are mixed and worked in with 8.5 gms. of a 17.5% solution of a copolymer made from 75 cc. of monomeric styrene, 60 cc. of olive oil, made up to 500 cc. with monomeric methyl methacrylate, in the presence of 1 gm. of benzoyl peroxide, in eugenol. A strong, hard mass is obtained.

*Example 18.*—20 gms. of calcium sulfate and 5 gms. of magnesium oxide are mixed and worked in with 10 gms. of a 17.5% solution of polymethyl methacrylate in eugenol. When set, a hard mass is obtained.

*Example 19.*—5 gms. of stannic oxide, 2 gms. of stannous hydroxide, 1 gm. of zinc oxide and 0.1 gm. of zinc acetate are mixed and worked in with 3 gms. of a 17.5% solution of methyl methacrylate in eugenol. A hard, strong set is obtained.

*Example 20.*—10 gms. of zinc oxide, 5 gms. of aluminum hydroxide and 0.2 gm. of tin acetate are mixed and worked in with a mixture of 2 gms. of anethole containing 15% polymethyl methacrylate in solution and 5 gms. of eugenol containing 17.5% of polymethyl methacrylate in solution. The mix sets hard.

*Example 21.*—5.5 gms. of zinc oxide and 0.1 gm. of zinc acetate are mixed and worked into 12.5 gms. of eugenol containing, in solution, 30% of a copolymer of vinyl acetate and methyl methacrylate (1:1). The mass sets strong and hard and adheres strongly to the containing vessel.

*Example 22.*—10 gms. of aluminum hydroxide, 5 gms. of zinc oxide, 3.5 gms. of magnesium oxide and 2.5 gms. of calcium hydroxide are mixed and worked in with 6 to 10 gms. of eugenol containing in solution 17.5% of polymethyl methacrylate. Even when the material sets it exerts an alkaline reaction with phenolphthalein.

*Example 23.*—15 gms. of zinc oxide, 5 gms. of stannic oxide and 0.5 gm. of zinc acetate are mixed and worked in with 5 gms. of eugenol containing 15% of polymeric methyl methacrylate in solution. The mix begins to set within a few minutes; the presence of 0.5 gm. of zinc acetate in the mix promotes the rapid setting.

Calcined zinc oxide may be substituted for the ordinary zinc oxide in the preceding as well as in other examples.

*Example 24.*—10 gms. of zinc oxide, 5 gms. of aluminum hydroxide are mixed and worked into between 5 to 10 gms. of eugenol containing between 10–20% of polystyrene or polymethyl methacrylate in solution and 1–5% of glacial acetic acid. The mass sets hard and strong, the setting being accelerated through the interaction between part of the zinc oxide with the acetic acid to provide the zinc acetate accelerator.

*Example 25.*—10 gms. of aluminum hydroxide, 5 gms. of zinc oxide and 0.2–0.5 gm. of zinc acetate are mixed and worked in with 10 gms. of eugenol containing, in solution, 30% of a copolymer of about 85% of vinyl chloride and about 15% of vinyl acetate. The mix sets hard and strong.

*Example 26.*—8.4 gms. of conventional dental synthetic porcelain, 2 gms. of zinc oxide and 0.05–0.2 gm. of zinc acetate are mixed and worked in with 15 gms. of a 17.5% solution of polystyrene or polymethyl methacrylate in eugenol. The material sets to a hard and strong mass.

*Example 27.*—4 gms. of a synthetic dental porcelain powder, 1 gm. of zinc oxide and 0.1 gm. of zinc acetate are mixed and worked in with 7.5 gms. of a 15% solution of polymeric methyl methacrylate in eugenol. The mix sets hard and strong.

*Example 28.*—5 gm. of synthetic dental porcelain powder, 2 gms. of zinc oxide, 1 gm. of stannic oxide and 0.1 gm. of zinc acetate are mixed and worked in with 3 gms. of a 15% solution of polymethyl methacrylate in eugenol. The mix sets hard and strong.

*Example 29.*—10 gms. of aluminum hydroxide, 10 gms. of titanium oxide, 5 gms. of magnesium oxide are mixed and worked in with 10 gms. of a 17.5% solution of polymethyl methacrylate or polystyrene in eugenol. When set, a hard mass is produced without any accelerator.

*Example 30.*—10 gms. of zinc oxide, 5 gms. of aluminum hydroxide and 0.5 gm. of stannous acid acetate are mixed and worked in with 5 gms. of a 15% solution of polystyrene in eugenol. The mix sets hard.

Numerous other polymers and copolymers may be used to dissolve in the aromatic liquids, in varying proportions, to form binding fluids, to be used with zinc oxide or the other metallic compounds mixed with the zinc oxide. Among such the following may be mentioned:

A copolymer formed by copolymerizing 25 cc. of olive oil with 180 cc. of monomeric methyl methacrylate and styrene (1:1), in the presence of 1 gm. of benzoyl peroxide. It polymerizes to form a hard opaque solid. Polymerization may be stopped just short of completion and the highly viscous mass may be mixed with eugenol or like aromatic liquid, to be used as a binding fluid which, when used with the metallic compounds, forms a rubbery, soft, elastic mass capable of being rolled and tamponed down into a tooth cavity, there to set.

Castor oil may be used instead of olive oil in the above copolymer. Butyl acetyl ricinoleate may also be substituted for the olive oil, forming a strong, hard, clear, transparent mass. Amyl cinnamic aldehyde may also be substituted for the olive oil, forming a strong, hard, clear, transparent mass, strongly adhering to the walls of the reaction vessel. Also amyl and allyl ricinoleates can be used.

Another copolymer that may be named is the following, made up from 75 cc. of monomeric methyl methacrylate, 10 cc. of monomeric styrene and 25 cc. of citronellal, in the presence of 1 gm. of benzoyl peroxide. It polymerizes at 125–160° F. to a transparent solid.

*Example 31.*—40 gms. of a rubbery mass, obtained by heating eugenol and polystyrene (1:1) on the hot plate, is dissolved in 100 cc. of eugenol. 40 gms. of this solution is worked in with 85 gms. of zinc oxide, to produce a strong cement solid. When 85 gms. of zinc oxide are mixed with 40 cc. of eugenol alone (8 times the amount of zinc oxide theoretically required to combine with the eugenol) the resulting set is brittle and weak.

The cementitious compounding of the nature described above are superior to the acid phosphate cements now extensively in use, both the oxyphosphates and the synthetic porcelain cements. The binding phosphoric acid liquid, even the modified type used with such cements, generally exerts an acid reaction, possibly being one factor contributing to the damaging of the tooth pulp. The chief product formed when zinc oxide is mixed with phosphoric acid, is used in dental practice, in the acid product of zinc acid phosphate ($ZnHPO_4$, so-called "zinc oxyphosphate"). Continued mixing of the powdered zinc oxide with the liquid phosphoric acid may cause the growing crystals to be broken and the set cementitious product lacks the proper coherence. (Outline of the Chemistry of Dental Materials, L. G. Wesson, 1942, p. 63.)

The cements of the present invention, containing as the binding fluid a non-volatile compound and possessing greater cohesion because of the synthetic plastic present therein, avoid both of the above disadvantages of the zinc oxide-phosphoric acid cements. Their acidity may be so controlled through the addition of the basis substances, calcium oxide and hydroxide and magnesium oxide and hydroxide and the like, as to render the final, set mix definitely on the alkaline side of neutrality. The greater adhesive qualities of the cements of the present invention is also a definite advantage.

The non-volatility of the binding fluid of the aromatic liquid with the synthetic plastic in solution is another advantage over the aqueous solutions of the phosphoric acid binding liquids used in the "oxyphosphate" and the synthetic "silicate" cements.

The hardening of the mixtures of the powder and fluid of the cements of the present invention offers an opportunity of effectively sealing the minute capillaries in the dentine, prior to the placing of the rest of the more compact mix on the surface of this layer, or even to superimpose a gold filling, or inlay, or the amalgam filling, or even the conventional synthetic cement, if so desired. The therapeutic effect of the thin mix, containing the beneficial eugenol, protects the inner structure of the dentine overlying the dental pulp and even the pulp itself, as against the corrosive phosphoric acid commonly used at present, or the ineffectual and uncertain mix of eugenol and zinc oxide, as used at present.

A mix of the nature described herein may likewise be pumped into the pulp cavity to form an effective pulp chamber filling, therein to solidify and to exert a bacteriostatic effect, especially if small amounts of copper oxide, silver oxide, or mercury oxide be admixed with the cement powder, the eugenol itself exerting a bactericidal effect.

Several ways lend themselves, in accordance with these specifications, for the use of the cementitious material in an advantageous manner. As pointed out above, the liquid eugenol or any of the other aromatic compounds named, may be mixed in the proportion of about ⅓ of liquid by weight or volume to 1 of the plastic powder, finely divided, and preferably in uniform size crystals; the smallness of the size of the crystals leading to the more rapid agglomeration of the powder and liquid. The mix, in a suitable container, is placed on a water bath, if necessary, to help the reaction along, and, when the mix assumes a gummy or gelatinous appearance, it may then be packed into a tooth cavity, therein speedily solidifying. Whether progressive copolymerization takes place, and some of the liquids may be so adjusted that this would take place, or whether hardening merely takes place as an initial reaction between the liquid and synthetic plastic, causing greater cohesion between the crystals, later resulting in solidification, in any case, such a cementing process may be utilized to great advantage.

Another advantageous method for making the cements of the present invention is to admix a metallic compound powder of the character described with powdered synthetic polymeric substance, and then to add the admixed powders to an aromatic liquid of the character described, or to a solution of polymeric substance in such aromatic liquid. The final mix, after thorough spatulation and mixing, may then be placed, in a vessel, on a water bath, for a short while, to initiate a setting reaction which is characterized by the mass becoming gummy and stringy, until agglomeration takes place to such an extent that the mass may be rolled or tamponed into a tooth cavity or otherwise used for cementing purposes, to complete the setting in situ. The final set may vary in texture from a soft, rubbery, elastic mass to a considerably tougher, more or less hardened, rubbery mass.

When the cements are prepared in this manner, non-substituted, as well as substituted hydroxylated aromatic liquids may be employed. Generally, the mixture of the metallic compound and polymeric powders are formed into a paste with at least sufficient aromatic liquid to thoroughly moisten all of the particles of the mix, and thoroughly mixed and worked up, prior to placing the container with the material on a water bath for the setting to begin. The setting, in some cases, is both a reaction between the zinc oxide, or other reacting oxide or hydroxide, with the hydroxylated aromatic liquid, as well as the coalescing reaction that the aromatic liquid exerts upon the polymer, which then causes the zinc oxide and the other pigments to be embedded within the rest of the mass; and, in some cases, where the oxide of the metal present will not react with the aromatic liquid, which may have a substituted hydroxyl grouping in the aromatic nucleus, the setting reaction is due to the surface action of the aromatic liquid upon the particles of the polymeric substance present, causing a cementing action, with the possible condensation between the aromatic liquid and the dissolved surface portion of the polymeric substance.

*Example 32.*—30 gms. of zinc oxide, 10 gms. of aluminum hydroxide and 10 gms. of a copolymer of vinyl chloride and vinyl acetate (93–95% vinyl chloride), are thoroughly intermixed and worked in with 12 gms. of eugenol containing, in solution, 20% of polyvinyl acetate. The containing vessel is placed on the water bath for a few minutes, until the material begins to coalesce and may be rolled and tamponed.

*Example 33.*—20 gms. of polymethyl methacrylate, and 8.1–10 gms. of zinc oxide are mixed and worked in with 10 gms. of eugenol containing, in solution, 17.5% of polystyrene. 0.2 gm. of zinc acetate is added, and the vessel is placed on a water bath. The mass soon becomes gummy and begins to solidify. It may be placed into a tooth cavity there to completely solidify, forming a strong, tough mass, slightly compressible at first.

*Example 34.*—26 gms. of an 18% solution of polystyrene in eugenol (containing 21.3 gms. of eugenol) is worked in with a mixture of 5.27 gms. of zinc oxide (combining molecular equivalent of the eugenol present) and 10 gms. of polymethyl methacrylate. 0.2 gm. of zinc acetate is added to promote the setting due to the reaction between the zinc oxide and eugenol. The mixture is placed on a water bath, where it soon turns into a tough rubbery mass.

*Example 35.*—15 gms. of polymethyl methacrylate are mixed with 10 gms. of zinc oxide and worked up with 15–20 gms. of saffrol. When placed on a water bath, in a container, the mixture soon becomes gummy, elastic and rubbery, and may be rolled and tamponed down into a tooth cavity.

The same may be performed using 10 gms. of saffrol containing 10% of polymethyl methacrylate in solution.

*Example 36.*—15 gms. of polymethyl methacrylate and 10 gms. of zinc oxide are thoroughly mixed and worked in with 15 gms. of anethole containing 12% of polymethyl methacrylate in solution. The mix is placed on a water bath. Coalescing soon begins, forming a rubbery, elastic mass which may be rolled and placed within a tooth cavity or may be used for moulding, shaping or impression taking. The mass remains rubbery for a long time.

The last two examples illustrate preparations in which setting may be initiated without any reaction between the zinc oxide and the hydroxyl grouping of the aromatic liquid, the hydroxyl group being substituted.

*Example 37.*—5 gms. of zinc oxide and 10 gms. of polymethyl metacrylate are mixed and worked in with 10 cc. of eugenol containing, in solution, 40% of a copolymer made up of 20% of alpha cinnamic aldehyde and 80% of a 3:1 mixture of styrene and methyl methacrylate. Placed on a water bath, an agglomeration of the solids soon begins.

*Example 38.*—30 gms. of zinc oxide and 10 gms. of polymethyl methacrylate are mixed and worked in with 15 gms. of eugenol into a paste. The mix is placed on a water bath and heated until it becomes rubbery and may be tamponed down into a tooth cavity.

*Example 39.*—30 gms. of polymethyl methacrylate or polystyrene and 10 gms. of zinc oxide are worked in with 15 cc. of eugenol containing 17.5% of polymethyl methacrylate in solution. Soon after placing the container on a water bath the mass becomes gummy and may be rolled into various shapes and, upon complete setting, forms a hard solid strong material. The rolled shapes may be softened by appropriate warming and reshaped.

Eugenol alone may be used as the binding fluid with the above solids, to provide a plastic mass which may also be rolled and shaped; but the material obtained from eugenol containing polymeric substance in solution is tougher and more compact.

*Example 40.*—5.08 gms. of zinc oxide are worked in with 20 cc. of eugenol methyl ether and allowed to stand in the container on the water bath for some time. No setting takes place. Addition of 5 more gms. of zinc oxide fails to initiate setting. 5 gms. of polymethyl methacrylate are then added to the mix and the mass soon thickens and becomes gummy and may be used as cementitious material.

The same occurs when iso-eugenol methyl ether is used; setting beginning only after the polymeric substance is added.

Zinc oxide with iso-eugenol does react to form a cementitious set without the addition of any polymer, since the non-substituted hydroxyl grouping is free to react with the zinc oxide.

*Example 41.*—15 gms. of polymethyl methacrylate and 10 gms. of zinc oxide are mixed and worked in with 15 gms. of anethole. Placed on a water bath, coalescence soon begins. The material remains a rubbery mass for a long time.

*Example 42.*—15 gms. of polymethyl methacrylate and 5 gms. of zinc oxide are mixed and worked in with 10 gms. of eugenol containing, in solution, 15% of a copolymer of styrene and methyl cinnamate (4:1). When heated on a water bath, the mass soon thickens and hardens to a strong material.

Oil of cloves, containing a high proportion of eugenol, or oil of bay, also containing eugenol and other aromatic liquids, may be used in place of eugenol, to form effective cementitious mixes.

It may here be stated that the preparations herein described, and particularly those exemplified by the last group of examples, may also be used to take dental impressions. They may also be used as cements for purposes other than dental, as cementing porcelain, leather to leather, and the like. The set or partially set materials may also be thinned down with some volatile fluid, like acetone or the like, and used for bottle capping, forming effective closures, or for coating various articles, as leather, for water proofing them. Among other uses that may suggest themselves for the preparations of the present invention is the casting and molding of various articles and the addition of luminous paint pigments to the preparations, in the course of formation, for the purpose of obtaining or forming luminous articles, as containers, tanks, ornaments, and the like, from them.

It may here be stated that whenever, in the claims, the terms "hydroxyl" or "hydroxylated," generally, are used, they are intended to include and cover aromatic compounds having alkyl, aryl and acyl substituted hydroxyl groupings.

This completes the description of the products and methods of the present invention. It is to be understood that the various examples set forth and the different proportions given therein or anywhere in the specification, are given by way of example only to illustrate the practice and principles of the present invention, and that I do not desire to be limited thereto; but wish to be protected for any and all modifications and variations possible in accordance with the principles of the invention, as covered by the claims hereto appended.

What I claim is:

1. A composition of matter containing polymeric substance derived from monomer selected from the group consisting of methyl methacrylate, styrene, vinyl acetate and vinyl chloride, and a solvent therefor selected from the group consisting of chavicol, methyl chavicol, eugenol, eugenol methyl ether, safrole, iso-chavicol, anethole, iso-eugenol, iso-eugenol methyl ether, iso-safrole.

2. A solution containing polymeric substance derived from monomer selected from the group consisting of methyl methacrylate, styrene, vinyl acetate and vinyl chloride, dissolved in a solvent selected from the group consisting of chavicol, methyl chavicol, eugenol, eugenol methyl ether, safrole, iso-chavicol, anethole, iso-eugenol, iso-eugenol methyl ether, iso-safrole.

3. A composition of matter containing polymeric substance derived from monomer selected from the group consisting of methyl methacrylate, styrene, vinyl acetate and vinyl chloride, a solvent therefor selected from the group consisting of chavicol, methyl chavicol, eugenol, eugenol methyl ether, safrole, iso-chavicol, anethole, iso-eugenol, iso-eugenol methyl ether, iso-safrole, and an inorganic metallic pigment.

4. The composition of matter of claim 3, in which the inorganic metallic pigment is zinc oxide.

5. The composition of matter of claim 3, in which the inorganic metallic pigment is aluminum silicate.

6. The composition of matter of claim 3, in which the inorganic metallic pigment is calcium aluminate.

7. A composition of matter containing polymeric substance derived from monomer selected from the group consisting of methyl methacrylate, styrene, vinyl acetate and vinyl chloride, dissolved in eugenol, and an inorganic metallic pigment.

8. A composition of matter containing polymeric substance derived from monomer selected from the group consisting of methyl methacrylate, styrene, vinyl acetate and vinyl chloride, dissolved in anethole, and an inorganic metallic pigment.

9. A composition of matter containing polymeric substance derived from monomer selected from the group consisting of methyl methacrylate, styrene, vinyl acetate and vinyl chloride, dissolved in safrole, and an inorganic metallic pigment.

10. A composition of matter containing polymerized methyl methacrylate, a solvent therefor selected from the group consisting of chavicol, methyl chavicol, eugenol, eugenol methyl ether, safrole, iso-chavicol, anethole, iso-eugenol, iso-eugenol methyl ether, iso-safrole, and an inorganic metallic pigment.

11. A composition of matter containing polymerized styrene, a solvent therefor selected from the group consisting of chavicol, methyl chavicol, eugenol, eugenol methyl ether, safrole, iso-chavicol, anethole, iso-eugenol, iso-eugenol methyl ether, iso-safrole, and an inorganic metallic pigment.

12. A composition of matter containing a copolymer of vinyl chloride-vinyl acetate, a solvent therefor selected from the group consisting of chavicol, methyl chavicol, eugenol, eugenol methyl ether, safrole, iso-chavicol, anethole, iso-eugenol, iso-eugenol methyl ether, iso-safrole, and an inorganic metallic pigment.

13. A composition of matter containing approximately 10 to 20 percent of polymeric substance derived from monomer selected from the group consisting of methyl methacrylate, styrene, vinyl acetate and vinyl chloride, dissolved in a solvent selected from the group consisting of chavicol, methyl chavicol, eugenol, eugenol methyl ether, safrole, iso-chavicol, anethole, iso-eugenol, iso-eugenol methyl ether, iso-safrole, and from 1 to 10 parts of an inorganic metallic pigment to the amount of said solvent used.

DAVID CURTIS.